(12) United States Patent
Binder et al.

(10) Patent No.: US 8,764,337 B2
(45) Date of Patent: Jul. 1, 2014

(54) DISTANCE DEVICE AND FASTENING SYSTEM HAVING DISTANCE DEVICE

(75) Inventors: Hans Binder, Böhmenkirch (DE); Ottmar Binder, Böhmenkirch (DE)

(73) Assignee: Hans und Ottmar Binder GBR, Bohmenkirch (DE)

( * ) Notice: Subject to any disclaimer, the term of this patent is extended or adjusted under 35 U.S.C. 154(b) by 56 days.

(21) Appl. No.: 13/139,080

(22) PCT Filed: Dec. 1, 2009

(86) PCT No.: PCT/EP2009/008539
§ 371 (c)(1),
(2), (4) Date: Jun. 10, 2011

(87) PCT Pub. No.: WO2010/066363
PCT Pub. Date: Jun. 17, 2010

(65) Prior Publication Data
US 2011/0243655 A1    Oct. 6, 2011

(30) Foreign Application Priority Data
Dec. 12, 2008    (DE) .......................... 10 2008 062 894

(51) Int. Cl.
*F16B 7/18*    (2006.01)
*F16L 15/00*    (2006.01)
*F16B 5/02*    (2006.01)

(52) U.S. Cl.
CPC ............. *F16B 5/0233* (2013.01); *F16B 5/0283* (2013.01)
USPC ..................... 403/343; 403/374.3; 403/408.1; 411/546; 224/326

(58) Field of Classification Search
USPC ............. 403/167, 168, 200, 299, 343, 374.3, 403/408.1; 411/535, 546; 224/326; 296/210
See application file for complete search history.

(56) References Cited

U.S. PATENT DOCUMENTS

| 5,288,191 A | 2/1994 | Rückert et al. |
| 6,357,953 B1 * | 3/2002 | Ballantyne ...................... 403/43 |

(Continued)

FOREIGN PATENT DOCUMENTS

| DE | 4220842 A1 | 1/1994 |
| DE | 4228625 C1 | 3/1994 |

(Continued)

OTHER PUBLICATIONS

English Translation—Opposition to DE 10 2008 062 894 dated Oct. 18, 2011 (with German language copy attached).

*Primary Examiner* — Gregory Binda
*Assistant Examiner* — Nahid Amiri
(74) *Attorney, Agent, or Firm* — Harness, Dickey & Pierce P.L.C.

(57) ABSTRACT

A distance device bridges a free space between a carrier part and a roof body for fastening a roof luggage rack, such as a roof rail, a roof strip or the like, on a vehicle roof by a threaded screw, with a support part and a counter support part. The support part and counter support part are held together by a threaded connection and can be adjusted relative to each other in order to set a bridging length. The support part or counter support part is carried along by a rotationally engaging connection with the threaded screw when it is screwed into a counter thread of the roof luggage rack or carrier part as far as a contact position with the carrier part or the roof body. The rotationally engaging connection has a plastic carrier into which the thread of the threaded screw is/has been screwed for carrying along with frictional resistance.

20 Claims, 3 Drawing Sheets

(56) References Cited

U.S. PATENT DOCUMENTS

| | | | |
|---|---|---|---|
| 6,776,566 B2 * | 8/2004 | Kobusch et al. | 411/546 |
| 6,994,503 B2 * | 2/2006 | Blatz | 411/432 |
| 7,048,487 B2 * | 5/2006 | Stone | 411/546 |
| 7,241,097 B2 * | 7/2007 | Dembowsky et al. | 411/369 |
| 7,296,947 B2 * | 11/2007 | Schmieder et al. | 403/370 |
| 2002/0076269 A1 | 6/2002 | Schwarzbich | |
| 2005/0047893 A1 | 3/2005 | Schwarzbich | |
| 2005/0053449 A1 | 3/2005 | Grubert et al. | |
| 2005/0102938 A1 | 5/2005 | Binder et al. | |
| 2006/0280579 A1 * | 12/2006 | Seidl et al. | 411/546 |
| 2008/0038090 A1 | 2/2008 | Figge et al. | |

FOREIGN PATENT DOCUMENTS

| | | |
|---|---|---|
| DE | 10239022 A1 | 3/2004 |
| DE | 202005010885 U1 | 10/2005 |
| DE | 202007017755 U1 | 4/2008 |
| EP | 1215401 A1 | 6/2002 |
| EP | 1705066 A1 | 9/2006 |

* cited by examiner

DISTANCE DEVICE AND FASTENING SYSTEM HAVING DISTANCE DEVICE

CROSS-REFERENCE TO RELATED APPLICATIONS

This application is a 371 U.S. National Stage of International Application No. PCT/EP2009/008539, filed Dec. 1, 2009. This application claims priority to German Patent Application No. DE 10 2008062894.8, filed Dec. 12, 2008. The disclosures of the above applications are incorporated herein by reference.

FIELD

The invention relates to a distance device for bridging a free space between a carrier part and a roof body for fastening a roof luggage rack, such as a roof rail, a roof strip or the like, on a vehicle roof by means of a threaded screw, with a support part and a counter support part, wherein support part and counter support part are held together by a threaded connection and can be adjusted relative to each other in order to set the bridging length in that the support part or counter support part is carried along by a rotationally engaging connection with the threaded screw when it is screwed into a counter thread of the roof luggage rack or carrier part as far as a contact position with the carrier part or the roof body.

BACKGROUND

Roof luggage racks, such as roof rails, roof strips and the like are mounted on the vehicle roof of a vehicle, wherein they are not supported on the roof body which consists of thin sheet metal but are connected to a carrier part of the roof of the vehicle by means of a distance device. The carrier part can absorb forces which are present with heavy roof loads. The carrier part is invisible from the outside, as it lies below the sheet metal of the roof body. The carrier part is also invisible from the interior of the vehicle, as it is covered by the internal cladding (roof lining). A free space, which is variable in size due to manufacturing tolerances, is formed between the underside of the roof body and the top of the carrier part. When the roof luggage rack is fitted, it must be ensured that there is a secure connection to the carrier part, but at the same time no pressure is exerted on the roof body which would lead to deformation of the sheet metal and be perceived as annoying distortion.

Distance devices which require elaborate fitting have been disclosed. For example, it is possible to use distance pieces of different lengths, wherein the fitter chooses the appropriate distance piece for the size of the free space available in each case. Furthermore, it has been disclosed that the distance piece has two parts which are held together by a threaded connection and which are adjusted for bridging the free space in that there is a rotational engagement with a threaded screw which is provided for fastening the roof luggage rack so that, when it is screwed in, the threaded screw displaces the two parts by means of the threaded connection by carrying them along to such an extent that the free space is bridged. A spring element, which is provided with leaf spring sections and which both enables the threaded screw to be pushed in, that is to say enables an axial movement thereof, and guarantees that a clamping force is exerted on the screw in such a way as to enable the above-mentioned rotational engagement with the threaded screw for setting the bridging length of the free space, is provided to enable the threaded screw to perform the carrying-along action. The spring element which is provided with leaf spring sections leads to a complex design.

SUMMARY

The invention is based on the object of specifying a simple distance device which is easy to fit.

Taking into account the characteristics mentioned in the introduction, this object is achieved in that the rotationally engaging connection has a plastic carrier into which the thread of the threaded screw is/has been screwed for carrying along with frictional resistance. The embodiment in the form of a plastic carrier guarantees a simple frictional carrying-along due to the relatively soft plastic material compared with the metal of the threaded screw which, after completion of the carrying-along process, allows the threaded screw to be turned further without any problems in order to fasten the roof luggage rack. The use according to the invention of a simple plastic carrier allows known distance devices which work on a principle which differs from that of the invention also to be used in accordance with the invention in that they can be easily fitted with the plastic carrier. This can be inserted without difficulty into the receptacle for the threaded screw.

According to an improvement of the invention, it is provided that the plastic carrier has an undersized internal thread for the threaded screw, an undersized screw channel and/or a receiving channel for self-cutting insertion of the thread of the threaded screw. If the undersized internal thread is provided, then the threaded screw can only be screwed into the undersized internal thread with appropriate frictional resistance, as a result of which the rotationally engaging connection is realized. If an undersized screw channel is provided, then the undersized screw channel binds on the spiral roof of the thread of the threaded screw, as a result of which the rotational carrying-along is likewise ensured. At the same time, with this embodiment, the threaded screw can also be moved axially in the undersized threaded channel with appropriate axial force. Furthermore, it is possible to use a receiving channel for self-cutting insertion of the thread of the threaded screw. The cutting of the thread of the threaded screw ensures a frictional connection which guarantees a rotational engagement. With the undersized internal thread and with the receiving channel, damage can occur to the thread due to a milling action of the screw thread if the threaded screw is screwed in further after the bridging dimension of the distance device has been set. Any combinations of the above-mentioned solutions are of course possible.

According to an improvement of the invention, it is provided that the plastic carrier is designed in the form of a carrier sleeve which has an internal channel for the threaded screw. The internal channel can in particular be the undersized internal thread, the undersized screw channel or the receiving channel for self-cutting.

It is advantageous when the carrier sleeve is fixed in the support part or counter support part or forms the support part or counter support part. In the first case, the carrier sleeve forms an insert part. In the second case, the whole support part or counter support part is designed in one piece and in doing so simultaneously realizes the carrier sleeve.

An improvement of the invention provides the creation of a rotational locking device between carrier sleeve and support part or counter support part, wherein the rotational locking device is designed in the form of an out-of-round external cross section of the carrier sleeve and a correspondingly shape-matched internal cross section of a cutout of the support part or counter support part. This guarantees that the carrier sleeve, which is set into rotation due to the engaging connection, turns the support part or counter support part with it in order to set the length of the distance device.

It is advantageous to provide a holder which can be or is fastened to the support part or counter support part in order to fix the support part or counter support part to the carrier part or to the roof structure. As a result of this measure, one part of the parts which are held together by the threaded connection is held stationary and consequently is unable to turn when the other part is turned. The holder also simplifies fitting, as the distance device does not leave its fitting position unintentionally. This also applies in pre-assembly when the bridging length has not yet been set.

Preferably, the holder can be fastened to the support part or counter support part by means of a clip fastener. The clip fastener holds the holder on the support part or counter support part so that it cannot turn. Alternatively, it is also possible for the holder to be designed in one piece with the support part or counter support part.

According to an improvement of the invention, it is provided that the holder has supporting and rear-engaging elements for fastening to the carrier part or to the roof body. Preferably, the holder is fastened to an edge region of a through-opening of the carrier part or roof body. The supporting elements are supported on the edge region of the through-opening, for example on the underside of the roof body, and the rear-engaging elements rest on the edge region of the through-opening on the top of the roof body so that a secure fixing to the carrier part or the roof body is guaranteed by the support and the rear engagement. The supporting and/or rear-engaging elements can be made from elastic material so that, for fastening, they can be moved and subsequently moved back again, as a result of which the support and/or rear engagement can be realized.

The holder is preferably designed in the form of an annular holder which encompasses the support part or counter support part. Consequently, it is pushed over the support part or counter support part like a ring and then preferably secured by means of the clip fastener.

An improvement of the invention provides that the support part is designed as an outer sleeve with an internal thread. Preferably, it is provided that the counter support part is designed as an inner sleeve which is provided with an external thread. The external thread of the inner sleeve is screwed into the internal thread of the outer sleeve, as a result of which the above-mentioned threaded connection between support part and counter support part for setting the bridging length is realized.

Furthermore, it is advantageous when the supporting and rear-engaging elements of the holder are designed to fix to the edge region of a through-opening of the roof body. This has already been discussed in detail above. Furthermore, it has been mentioned that the supporting and/or rear-engaging elements can be made of elastic material; preferably it is provided that they are formed by or have elastic retaining arms.

The invention further relates to a fastening arrangement having a vehicle roof which has at least one carrier part and one roof body, a roof luggage rack and a distance device, in particular according to one or more of the above-mentioned embodiments, for fastening the roof luggage rack, such as a roof rail, a roof strip or the like, on the vehicle roof, wherein the roof body has a through-opening, to the edge region of which the distance device can be fastened, and wherein the distance device protrudes through the through-opening towards the roof luggage rack to rest thereon. This protrusion takes place by means of a support part or counter support part of the distance device without contact with the through-opening so that no deforming forces act on the roof body.

BRIEF DESCRIPTION OF THE DRAWINGS

The drawings illustrate the invention with reference to an exemplary embodiment, namely.

DETAILED DESCRIPTION

Figure 1:
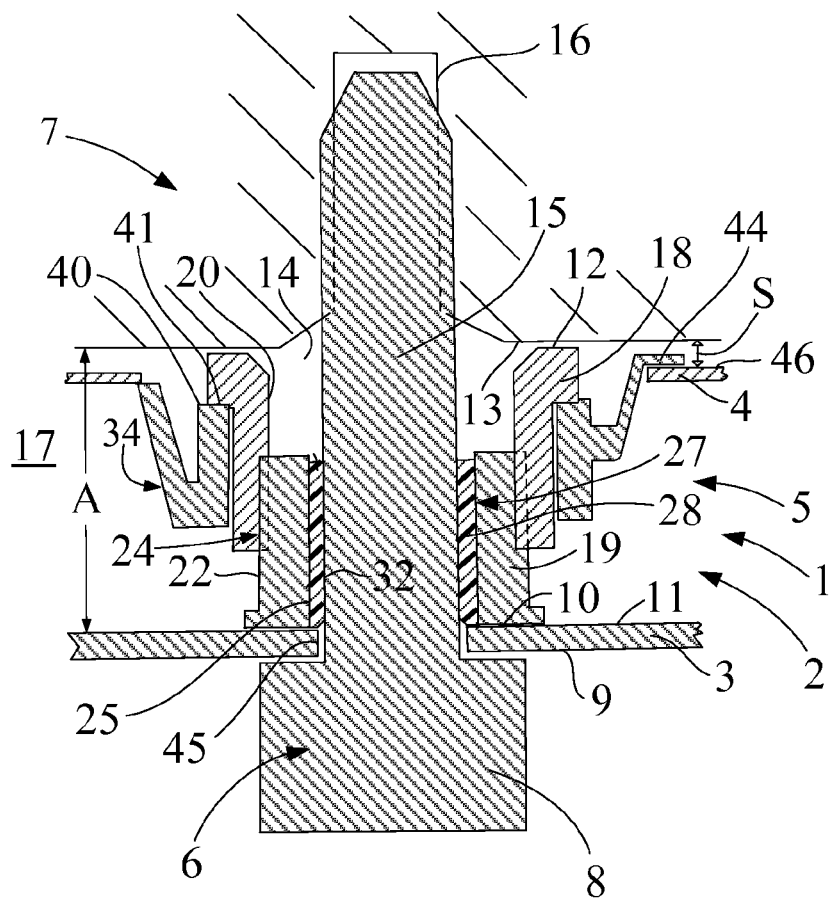
FIG. 1 shows a schematic section view through a fastening arrangement with a distance device.

FIG. 1 shows a section of a fastening arrangement 1 having a vehicle roof 2, of which a region of a carrier part 3 and a region of a roof body 4 is shown. The roof body is a roof panel of the vehicle, in particular a motor vehicle, which is visible from the outside; the carrier part 3 is a stable component of the vehicle roof 2 which is not visible either from the outside or from the interior of the vehicle and is capable of absorbing high forces. Between carrier part 3 and roof body 4 is located a distance device 5 with which is associated a threaded screw 6 by means of which a roof luggage rack 7 is retained outside on the roof of the vehicle, wherein only a small section of the roof luggage rack 7 is shown.

It is clear from FIG. 1 that a head 8 of the threaded screw is clamped against the underside 9 of the carrier part 3, that because of the clamping force applied to the roof luggage rack 7 by the threaded screw 6 the underside of the distance device 5 is supported on the top 11 of the carrier part 3, and that the top 12 of the distance device 5 is supported on the underside 13 of the roof luggage rack 7 so that the roof luggage rack 7 is securely clamped to the carrier part 3 without forces which could lead to a deformation of the roof body 4 acting on the roof body 4. The roof body 4 has a through-opening 14 for the threaded screw 6 and the distance device 5 to protrude through. A threaded shaft 15 of the threaded screw 6 is screwed into a threaded hole 16 (counter thread) on the underside 13 of the roof luggage rack 7 to achieve the mentioned clamping. The roof luggage rack 7 can be designed as a roof strip, for example. From all this, it is clear that the distance device 5 spans a free space 17 with a bridging length A, wherein—depending on manufacturing tolerances—the bridging length A can vary in individual vehicles and/or is of a different magnitude in different vehicle types, so that the distance device 5 must be capable of compensating for these differences when fitted. The design of the distance device 5 will therefore be discussed in detail below.

According to FIGS. 1 to 4, the distance device 5 has a support part 18 and a counter support part 19. The support part 18 is designed as an outer sleeve with an internal thread 20 and the counter support part 19 as an inner sleeve with an external thread 22. Support part 18 and counter support part 19 are connected to one another by means of the internal thread 20 and the external thread 22, that is to say these two parts are screwed together. The further the inner sleeve 19 is screwed out of the outer sleeve 18, the longer the distance device 5 and therefore the bridging length A becomes. In the not yet fitted state, the inner sleeve 19 is screwed into the outer sleeve 18 to such an extent as to provide a total length of the distance device 5 which is less than the bridging length A.

Internal thread 20 and external thread 22 form a threaded connection 24 between support part 18 and counter support part 19.

Figure 2:
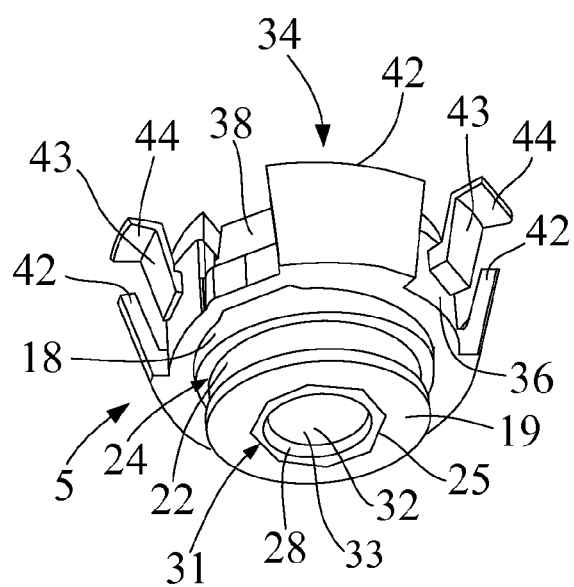
FIG. 2 shows the distance device in perspective view at an angle from below.
Figure 3:
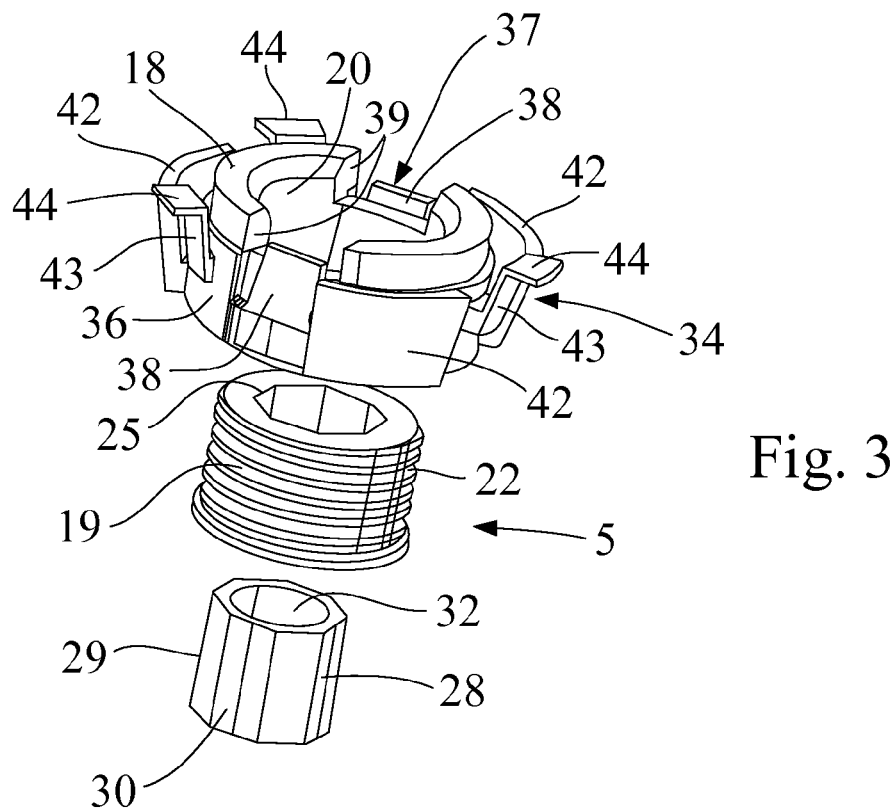
FIG. 3 shows an exploded view of the distance device.
Figure 4:
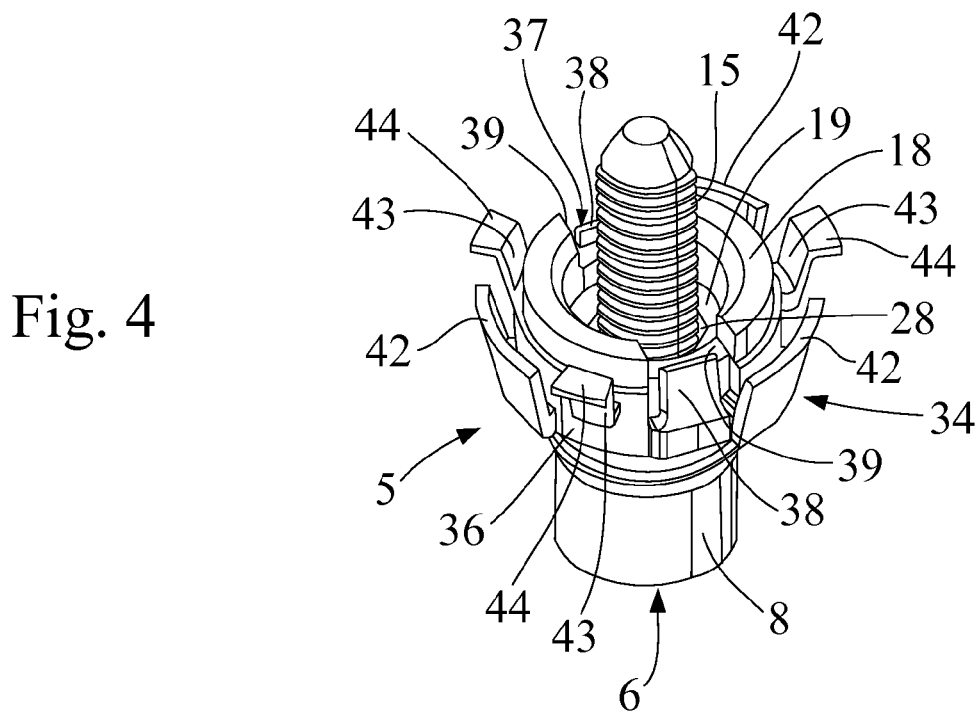
FIG. 4 shows a perspective view of the distance device at an angle from above with threaded screw.

The counter support part 19 has a cutout 25 which—particularly according to FIGS. 2 and 3—can have an octagonal internal cross section. A rotationally engaging connection in the form of a plastic carrier 28 is arranged, in particular axially inserted, in the cutout 25, wherein the plastic carrier 28 is preferably designed as a carrier sleeve. The carrier sleeve 28 has an external cross section, which is shape-matched to the internal cross section of the control 25 and which consequently can also be designed octagonally. Other out-of-round, that is to say non-circular, cross sections, which lead to a rotational locking arrangement being formed between counter support part 19 and plastic carrier 28, can be used in place of the octagonality.

The plastic carrier 28 has an internal channel 32 for accommodating the threaded shaft 15 of the threaded screw 6, wherein, in the present exemplary embodiment, the internal channel 32 is designed as an undersized screw channel, i.e. the threaded shaft 15 has no play in the undersized screw channel 32, but the smooth channel walls of the undersized screw channel 32 exert a radial force on the threaded shaft 15, which however is not so great that the threaded screw 6 can no longer turn relative to the plastic carrier 28, but the parts can turn relative to one another above a certain specifiable torque. Furthermore, it is possible to move the threaded shaft 15 axially within the undersized screw channel 32, which however likewise requires an appropriate movement force due to the clamping effect of the plastic carrier 28 on the threaded shaft.

Figure 5:
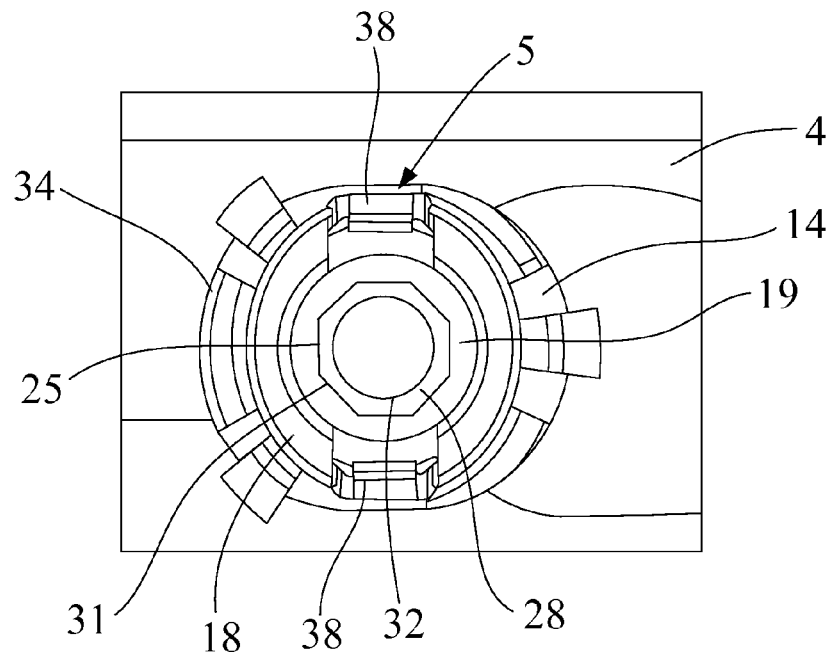
FIG. 5 shows a view on the distance device and a roof body of a vehicle from above.
Figure 6:
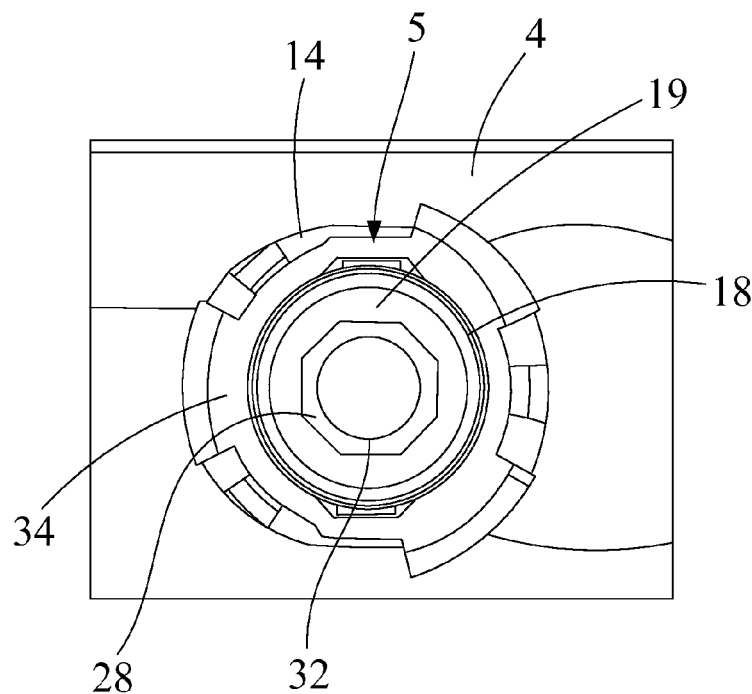
FIG. 6 shows of view on the arrangement of FIG. 5 from below.

A holder 34, which is releasably fastened to the support part 18, is provided in order to be able to hold the distance device 5 stationary, and in particular so that it cannot turn, when it is fitted to the roof body 4. The holder 34 is designed as an annular holder. It has a ring 36 which is pushed axially onto the support part 18 to such an extent that a clip fastener 37 engages with the support part 18. The clip fastener 37 has two diametrically opposed latching hooks 38 which engage radially in axial recesses 39 of the support part 18 which are open at the edge. At the same time, a ring face surface 40 of the ring 36 abuts a ring step 41 of the support part 18 so that no axial movement of the holder 34 is possible on the support part 18. The latching hooks 38 which engage in the recesses 39 prevent a relative rotation of holder 34 and support part 18. Supporting elements 42 and rear-engaging elements 43 are formed preferably in one piece on the outer surface of the ring 36 of the holder 34, wherein preferably three supporting elements 42 with equal angular spacing and three rear-engaging elements 43 with equal angular spacing are provided. Supporting elements 42 and rear-engaging elements 43 are designed in the form of arms, that is to say they are able to spring radially on account of the flexibility of the material, in particular of plastic material. The rear-engaging elements 43 have rear-engaging tongues 44 which point radially outwards. If—according to FIGS. 5 and 6—the distance device 5 is to be fastened in the through-opening 14 of the roof body 4, then the distance device 5 is inserted in the through-opening 14 from the outside, that is to say from outside the vehicle, in such a way that the supporting elements 42, which run substantially at an angle to the longitudinal extension of the distance device, spring radially inwards. As soon as the rear-engaging tongues 44 rest on the top of the roof body 4, the supporting elements 42 snap elastically radially outwards by leaving the edge of the through-opening 14 and in this way are supported on the underside of the roof body 4. As a result, the distance device 5 is securely clipped in the through-opening 14, wherein—according to FIGS. 5 and 6—protection against turning is also provided due to the out-of-round cross section of the through-opening 14 and the likewise out-of-round structure of the distance device 5. Furthermore, it can be seen from FIGS. 5 and 6 that the diameter of the support part 18 is smaller than the smallest diameter of the through-opening 14 so that—according to FIG. 1—there is no contact between roof body 4 and support part 18 and, furthermore, the support part 18 protrudes outwards from the through-opening 14 to such an extent that a roof luggage rack 7 which is fastened here is supported on the support part 18 and not on the roof body 4.

The functionality is as follows: To fit the roof luggage rack 7 on the vehicle roof 2, a distance device 5, in which the support part 18 and counter support part 19 are screwed together to a small bridging distance, is initially clipped from the outside—as described above—into the through-opening 14 of the roof body 4. With the roof lining not yet fitted or with the roof lining removed, the threaded screw 6 is then fed through a through-hole 45 of the carrier part 3 and pressed into the undersized screw channel 32 from the interior of the vehicle. Due to the undersize, this requires an appropriate force and can only be carried out in an axial direction until the free end of the threaded shaft 15 of the threaded screw 6 comes into contact with the threaded hole 16 of the roof luggage rack 7 which is placed on the vehicle roof 2 from the outside. The threaded screw 6 is now screwed into the threaded hole 16 with a suitable tool. As the carrier sleeve 28 is carried along at the same time by the turning of the threaded screw 6 due to a frictional resistance, the counter support part 19 is screwed axially out of the support part 18 until the underside 10 of the counter support part 19 comes into contact with the top 11 of the carrier part 3. In this situation, the threaded screw 6 is not yet completely screwed into the threaded hole 16. If the threaded screw 16 is now turned further, then the frictional resistance between the plastic carrier 28 and the threaded screw is overcome. The screw 6 is turned until the roof luggage rack 7 is secure. In doing so, it is supported by its underside 13 on the top 12 of the support part 18, the underside 10 of the counter support part 19 is supported on the top 11 of the carrier part 3 and the head 8 of the threaded screw 6 rests on the underside 9 of the carrier part 3. The top 46 of the roof body 4 is at a distance S from the underside 13 of the roof luggage rack 7 which is greater than the thickness of the rear-engaging tongues 44 so that these are not crushed. The roof luggage rack 7 is therefore firmly and securely connected to the carrier part 3 of the vehicle roof 2 without inadmissible forces being exerted on the roof body 4.

Naturally, a plurality of fastening arrangements 1 is preferably provided over the longitudinal extension of the roof luggage rack 7.

The invention claimed is:

1. A distance device for bridging a free space between a carrier part and a roof body for fastening a roof rack on a vehicle roof, the distance device comprising:
   a threaded screw;
   a support part and a counter support part, held together by a threaded connection, the support part and counter support part adjustable relative to one another to set a bridging length in that one of the support part and counter support part is carried along by a rotationally engaging connection with the threaded screw when screwed into the roof rack and the carrier part;
   a carrier sleeve having an internal channel for receiving the threaded screw, the carrier sleeve carried along with the threaded screw by friction, the carrier sleeve having an out-of-round external cross section cooperating with a shape-matched internal cross section of a cutout of one of the support part and counter support part for rotationally locking the carrier sleeve and the one of the support part and counter support part; and a holder fastenable to one of the support part and the counter support part in order to fix the one of the support part and the counter support part to one of the carrier part and the roof body;

wherein the holder is fixed in one of the support part and the counter support part by a clip fastener, the holder has supporting and rear-engaging elements for fastening to one of the carrier part and the roof body, and the supporting and rear-engaging elements of the holder are adapted to fix to an edge region of a through-opening of the roof body; and wherein the support part and the counter support part both circumferentially surround the threaded screw and the holder circumferentially surrounds both the support part and the counter support part.

2. The distance device of claim 1, wherein the carrier sleeve has an undersized internal thread for the threaded screw, an undersized screw channel and/or a receiving channel for self-cutting of the thread of a threaded screw.

3. The distance device of claim 1, wherein the carrier sleeve is fixed in one of the support part and counter support part.

4. The distance device of claim 1, wherein the holder is an annular holder which encompasses one of the support part and the counter support part.

5. The distance device of claim 1, wherein the support part is an outer sleeve with an internal thread.

6. The distance device of claim 1, wherein the counter support part is an inner sleeve provided with an external thread.

7. The distance device of claim 1, wherein at least one of the supporting and rear-engaging elements are formed by elastic retaining arms.

8. The distance device of claim 1 in combination with the vehicle roof having at least one carrier part and one roof body, and a roof luggage rack wherein the roof body has a through-opening to an edge region of which the distance device is fastened to the edge region of the through-opening, and further wherein the distance device protrudes through the through-opening towards the roof luggage rack to rest thereon.

9. The combination of claim 8, wherein one of the support part and the counter support part of the distance device protrudes through the through-opening of the roof body without contact.

10. A distance device for bridging a free space between a carrier part and a roof body for fastening a roof rack on a vehicle roof, the distance device comprising:

a threaded screw;

first and second parts connected to one another through a threaded connection, the first and second parts adjustable relative to one another by relative rotation to establish a bridging length;

a carrier sleeve having an out-of-round external cross section cooperating with a shape-matched internal cross section of the second part for rotationally locking the carrier sleeve and the second part, the carrier sleeve receiving a shank of the threaded screw and retained on the shank in an axial direction under friction;

wherein initial rotation of the threaded screw into the roof rack increases the bridging length until the bridging length spans a space between the carrier part and the roof body and the friction between the shank of the threaded screw is overcome during subsequent rotation of the carrier sleeve such that the carrier sleeve axially translates along the shank so that the bridging length no longer increases; and a holder fastenable to one of the first part and the second part in order to fix the one of the first part and the second part to one of the carrier part and the roof body;

wherein the holder is fixed in one of the first part and the second part by a clip fastener, and the holder has supporting and rear-engaging elements for fastening to one of the carrier part and the roof body and the supporting and rear-engaging elements of the holder are designed to fix to an edge region of a through-opening of the roof body; and wherein the first and second parts both circumferentially surround the threaded screw and the holder circumferentially surrounds both the first and second parts.

11. The distance device of claim 10, wherein the first part is an inner sleeve with an external thread.

12. The distance device of claim 10, wherein the second part is an outer sleeve with an internal thread.

13. The distance device of claim 10, wherein the holder is an annular holder.

14. The distance device of claim 10, wherein the carrier sleeve is fixed in the second part.

15. The distance device of claim 1, wherein the holder is releasably fastened to the support part and functions to hold the distance device stationary when fitted to the roof body, the holder has a ring pushed axially onto the support part such that the clip fastener engages with the support part, the clip fastener has two diametrically opposed latching hooks engaging radially in axial recesses of the support part, a ring face surface of the ring abuts a step of the support part to prevent axial movement of the holder on the support part, the latching hooks prevent relative rotation between the holder and support part.

16. The distance device of claim 10, wherein the holder is releasably fastened to the first part and functions to hold the distance device stationary when fitted to the roof body, the holder has a ring pushed axially onto the first part such that the clip fastener engages with the first part, the clip fastener has two diametrically opposed latching hooks engaging radially in axial recesses of the first part, a ring face surface of the ring abuts a step of the first part to prevent axial movement of the holder on the first part, the latching hooks prevent relative rotation between the holder and first part.

17. A distance device for bridging a free space between a carrier part and a roof body for fastening a roof rack on a vehicle roof, the distance device comprising:

a threaded screw;

a support part and a counter support part, held together by a threaded connection, the support part and counter support part adjustable relative to one another to set a bridging length in that one of the support part and counter support part is carried along by a rotationally engaging connection with the threaded screw when screwed into the roof rack and the carrier part;

a carrier sleeve having an internal channel for receiving the threaded screw, the carrier sleeve carried along with the threaded screw by friction, the carrier sleeve having an out-of-round external cross section cooperating with a shape-matched internal cross section of a cutout of one of the support part and counter support part for rotationally locking the carrier sleeve and the one of the support part and counter support part; and a holder releasably fastened to the support part by a clip fastener, the holder having supporting and rear-engaging elements for fastening to one of the carrier part and the roof body, and the supporting and rear-engaging elements of the holder are adapted to fix to an edge region of a through-opening of the roof body;

wherein the holder functions to hold the distance device stationary when fitted to the roof body, the holder has a ring pushed axially onto the support part such that the clip fastener engages with the support part, the clip fastener has two diametrically opposed latching hooks engaging radially in axial recesses of the support part, a ring face surface of the ring abuts a step of the support part to prevent axial movement of the holder on the support part, the latching hooks prevent relative rotation between the holder and support part.

18. A distance device for bridging a free space between a carrier part and a roof body for fastening a roof rack on a vehicle roof, the distance device comprising:

a threaded screw;

first and second parts connected to one another through a threaded connection, the first and second parts adjustable relative to one another by relative rotation to establish a bridging length;

a carrier sleeve having an out-of-round external cross section cooperating with a shape-matched internal cross section of the second part for rotationally locking the carrier sleeve and the second part, the carrier sleeve receiving a shank of the threaded screw and retained on the shank in an axial direction under friction;

wherein initial rotation of the threaded screw into the roof rack increases the bridging length until the bridging length spans a space between the carrier part and the roof body and the friction between the shank of the threaded screw is overcome during subsequent rotation of the carrier sleeve such that the carrier sleeve axially translates along the shank so that the bridging length no longer increases; and a holder releasably fastened to the first part by a clip fastener in order to fix the first part to one of the carrier part and the roof body, the holder having supporting and rear-engaging elements for fastening to one of the carrier part and the roof body and the supporting and rear-engaging elements of the holder are designed to fix to an edge region of a through-opening of the roof body;

wherein the holder functions to hold the distance device stationary when fitted to the roof body, the holder has a ring pushed axially onto the first part such that the clip fastener engages with the first part, the clip fastener has two diametrically opposed latching hooks engaging radially in axial recesses of the first part, a ring face surface of the ring abuts a step of the first part to prevent axial movement of the holder on the first part, the latching hooks prevent relative rotation between the holder and the first part.

19. A distance device for bridging a free space between a carrier part and a roof body for fastening a roof rack on a vehicle roof, the distance device comprising:

a threaded screw;

a support part and a counter support part, adjustable relative to one another to set a bridging length;

a carrier sleeve having an internal channel for receiving the threaded screw, the carrier sleeve operative to rotationally lock the carrier sleeve and the one of the support part and counter support part; and a holder releasably fastened to one of the support part and the counter support part by a clip fastener, the holder having supporting and rear-engaging elements for fastening to one of the carrier part and the roof body, and the supporting and rear-engaging elements of the holder are adapted to fix to an edge region of a through-opening of the roof body; and wherein the support part and the counter support part both circumferentially surround the threaded screw and the holder circumferentially surrounds both the support part and the counter support part.

20. A distance device for bridging a free space between a carrier part and a roof body for fastening a roof rack on a vehicle roof, the distance device comprising:

a threaded screw;

a support part and a counter support part, adjustable relative to one another to set a bridging length;

a carrier sleeve having an internal channel for receiving the threaded screw, the carrier sleeve operative to rotationally lock the carrier sleeve and the one of the support part and counter support part; and a holder releasably fastened to the support part by a clip fastener, the holder having supporting and rear-engaging elements for fastening to one of the carrier part and the roof body, and the supporting and rear-engaging elements of the holder are adapted to fix to an edge region of a through-opening of the roof body;

wherein the holder functions to hold the distance device stationary when fitted to the roof body, the holder has a ring pushed axially onto the support part such that the clip fastener engages with the support part, the clip fastener has two diametrically opposed latching hooks engaging radially in axial recesses of the support part, a ring face surface of the ring abuts a step of the support part to prevent axial movement of the holder on the support part, the latching hooks prevent relative rotation between the holder and support part.

* * * * *